R. L. EWALD.
STEAM COOKER.
APPLICATION FILED JUNE 22, 1915.

1,177,502.

Patented Mar. 28, 1916.
4 SHEETS—SHEET 3.

WITNESSES:
O. Johnson
Frank Warren

INVENTOR
Raymond L. Ewald
BY
C. D. Haskins
ATTORNEY

R. L. EWALD.
STEAM COOKER.
APPLICATION FILED JUNE 22, 1915.

1,177,502.

Patented Mar. 28, 1916.
4 SHEETS—SHEET 4.

WITNESSES:
O. Johnson
Frank Warren

INVENTOR
Raymond L. Ewald
BY
C. S. Haskins
ATTORNEY

UNITED STATES PATENT OFFICE.

RAYMOND L. EWALD, OF SEATTLE, WASHINGTON.

STEAM-COOKER.

1,177,502.   Specification of Letters Patent.   Patented Mar. 28, 1916.

Application filed June 22, 1915. Serial No. 35,534.

*To all whom it may concern:*

Be it known that I, RAYMOND L. EWALD, citizen of the United States, residing at Seattle, in the county of King and State of Washington, have invented a certain new and useful Improvement in Steam-Cookers, of which the following is a specification.

My invention relates to improvements in steam cookers which are adapted for use in fruit and vegetable canneries and in fish canneries to effect the operation of cooking or heating food products after such products are disposed within cans; and the object of my invention is to provide a steam cooker which shall be adapted to be actuated by power communicated to it from a suitable motor automatically to cause cans containing food products to be conducted successively thereinto and be moved to travel therein throughout the length of a winding path at such rate of speed as will subject such cans to the radiant heat of associated steam-heated pipes for a required length of time and then successively eject said cans therefrom and place them on suitable means for further disposal; and which shall operate to rotate such cans continuously by rolling them over said winding path whereby their coating of tin shall not be subjected to abrasion and whereby their contents shall be more evenly heated. I attain this object by devices illustrated in the accompanying drawings wherein—

Figure 1:
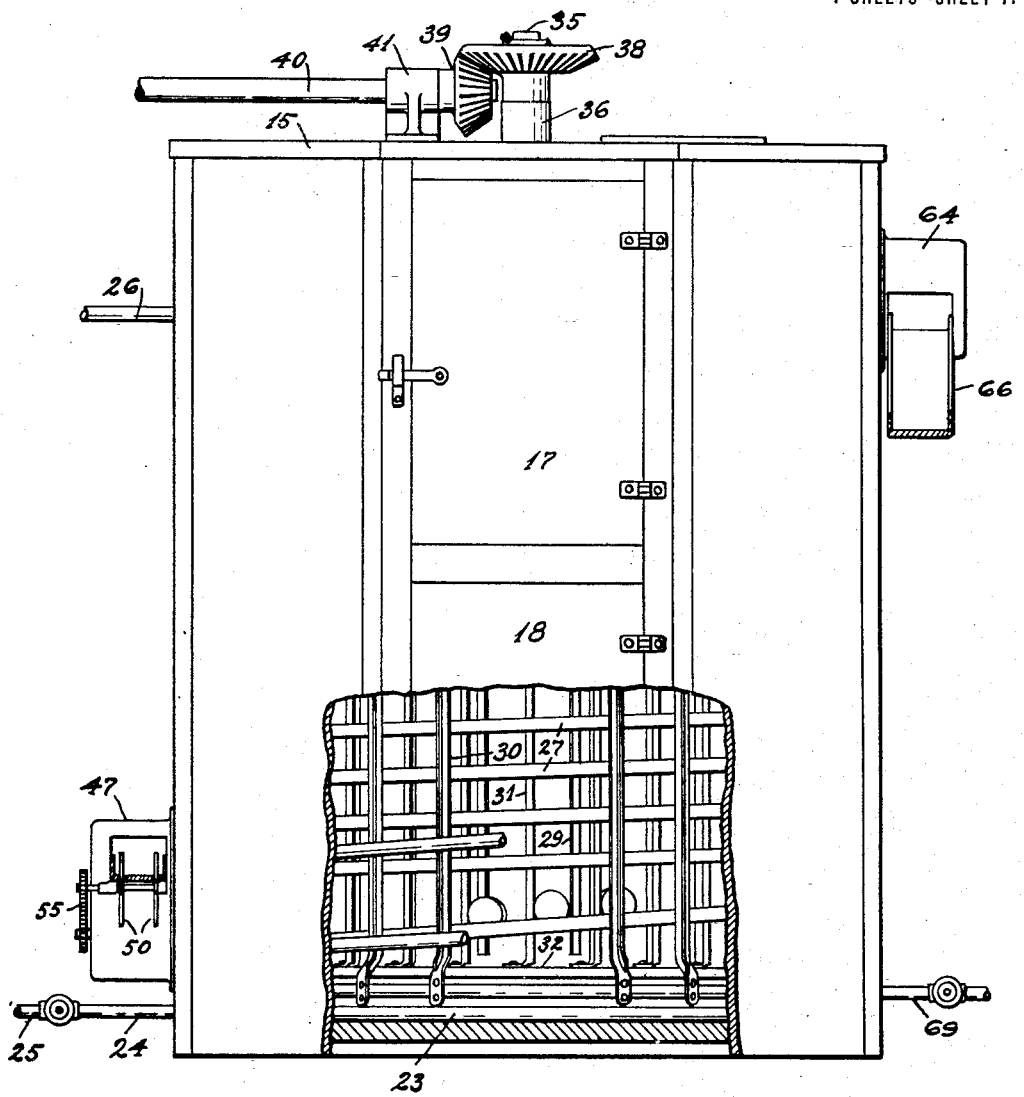
Figure 2:
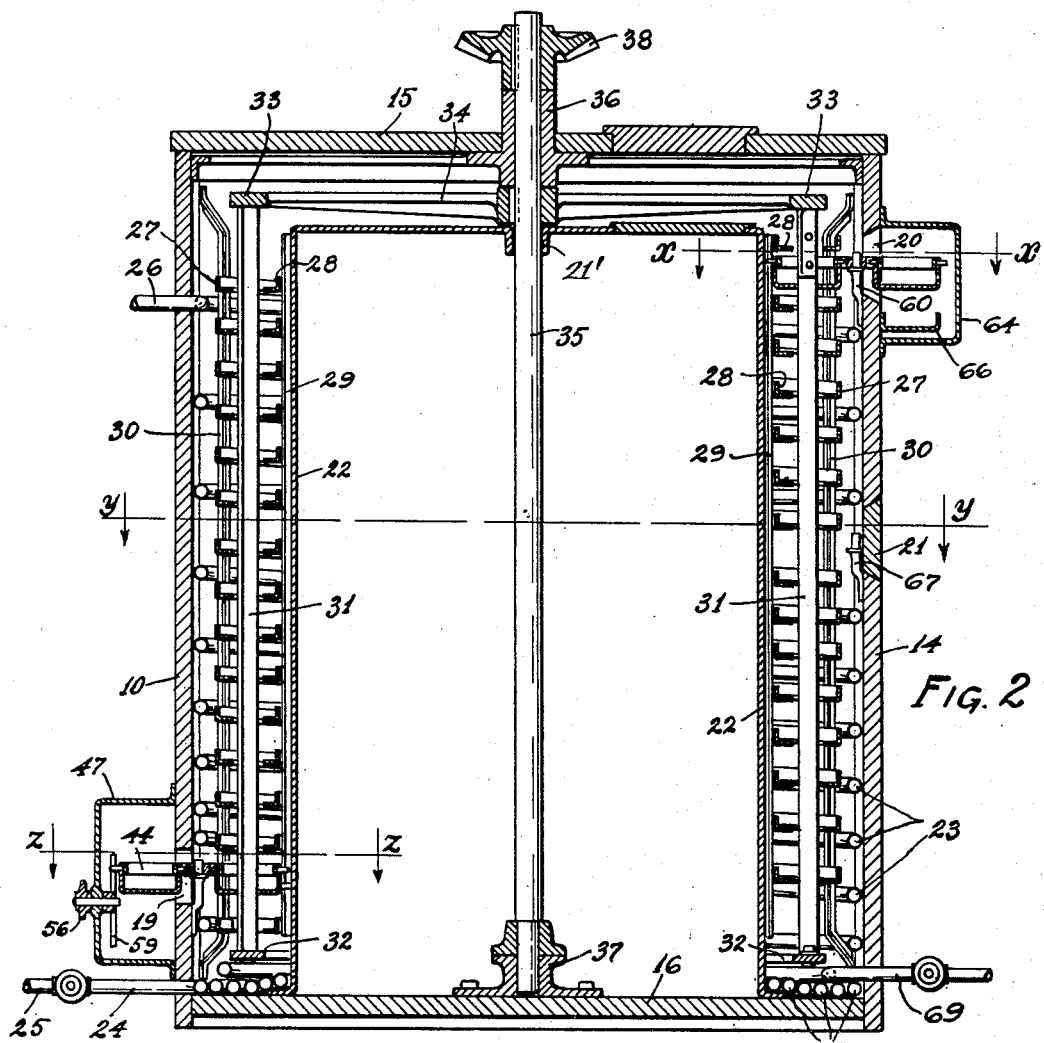
Figure 3:
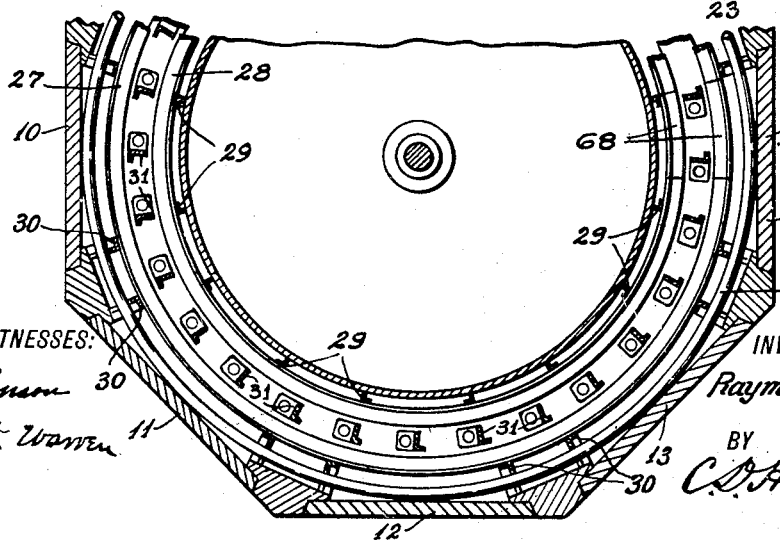
Figure 4:
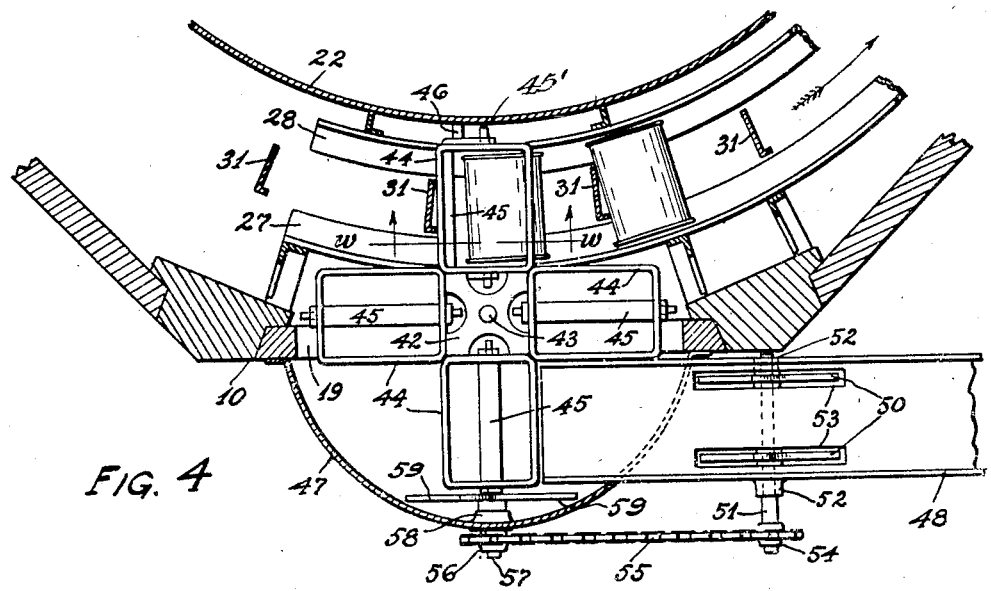
Figure 5:
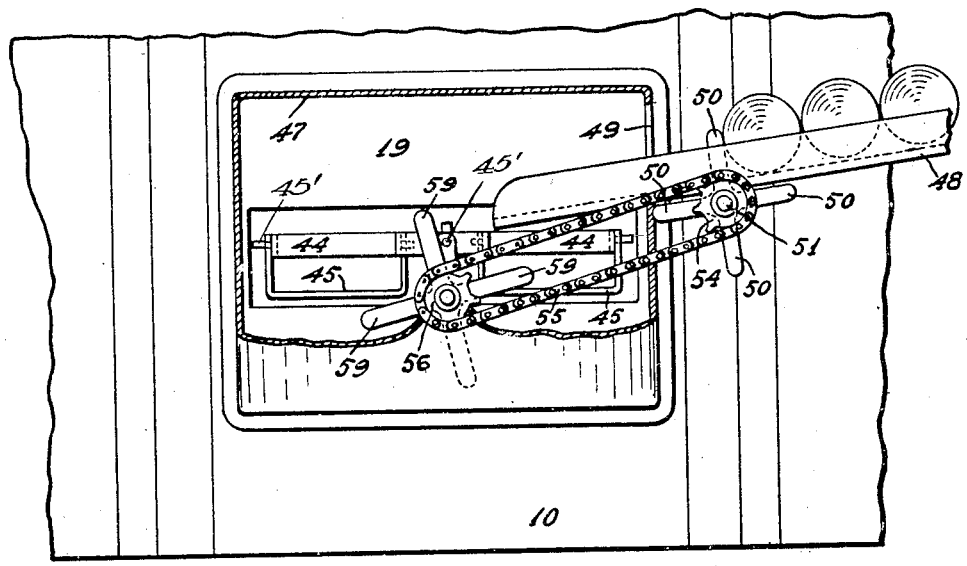
Figure 6:
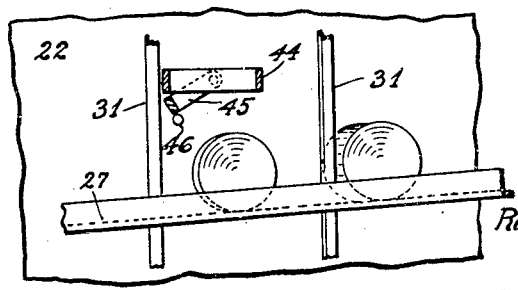
Figure 7:
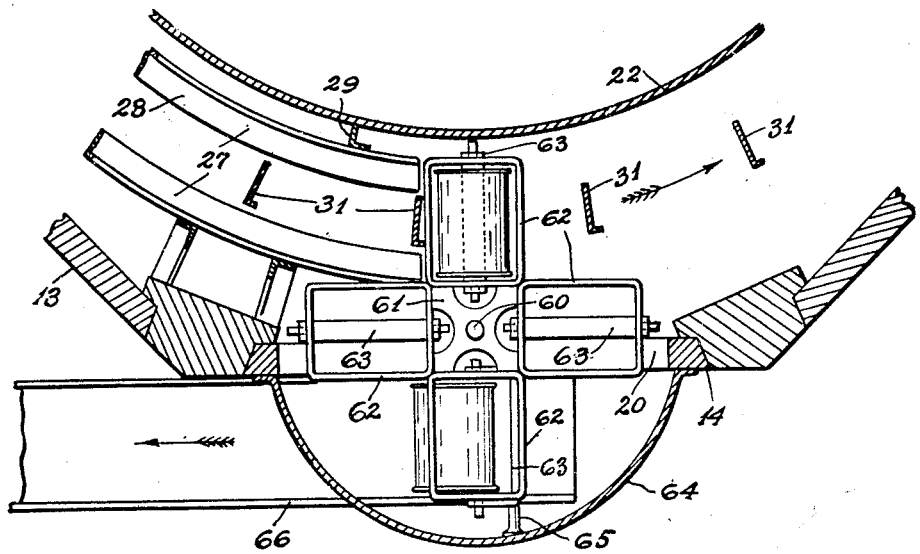
Figure 8:
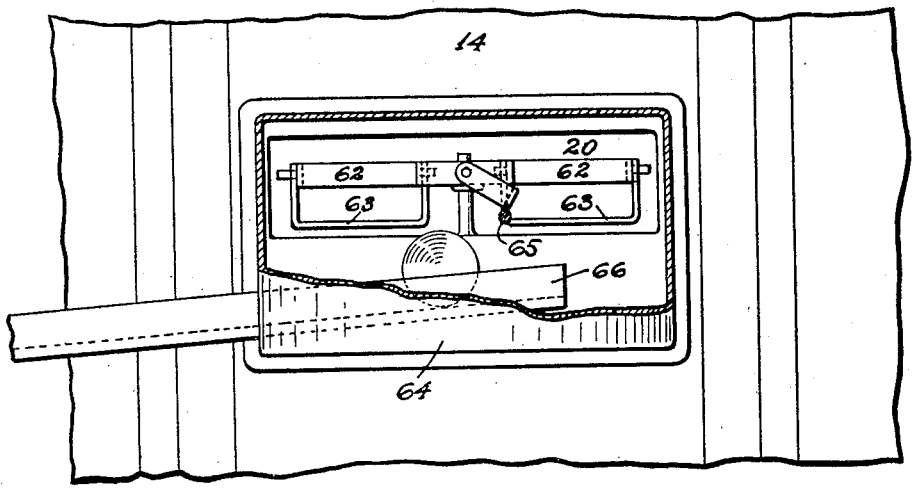

Figure 1 illustrates a structure embodying my invention by a view in front elevation, a portion of the inclosing case being broken away better to show some of its internal parts; Fig. 2 is a view of the same in vertical mid-section; Fig. 3 is a fragmentary view of the same in horizontal cross-section on broken line *y, y* of Fig. 2; Fig. 4 is an enlarged fragmentary view of the same in horizontal cross-section on broken line *z, z* of Fig. 2; Fig. 5 is an enlarged fragmentary view of the same in side elevation showing spacing mechanism associated with an inlet passageway for cans of food products; Fig. 6 is an enlarged fragmentary view of the same showing parts of details thereof; Fig. 7 is an enlarged fragmentary view of parts of the same in horizontal cross-section on broken line *x, x* of Fig. 2, showing mechanism for ejecting cans of food products through an outlet passageway of the structure; and Fig. 8 is an enlarged fragmentary view in side elevation showing parts of said ejecting mechanism in association with an outlet passageway through which cans of food products may be ejected.

Referring to the drawings, throughout which like reference numerals indicate like parts, an inclosing case having eight vertical side walls, as side walls 10, 11, 12, 13 and 14, and top and bottom walls 15 and 16, respectively, is provided with doors 17 and 18 in its front side wall 12 and with an inlet passageway 19 for cans of food products in the lower portion of the side wall 10 while its opposite side wall 14 is provided with an outlet passageway 20 disposed in the upper end portion thereof through which passageway 20 cans of food products may be ejected, and at a lower point in said side wall 14 is another outlet passageway closed by a removable panel 21 which lower outlet passageway may be used instead of the passageway 20, as may be required, by removing said panel 21 and placing it in the passageway 20. Within said inclosing case is concentrically disposed a drum 22, of thick sheet metal, with its outwardly flanged lower end secured to the bottom wall 16 of the inclosing case, which bottom wall 16 thus forms a bottom wall for said drum 22, which drum 22 is of such height as will afford space for mechanism hereinafter described between its top wall and the top wall 15 of the inclosing case, and said drum 22 is of such diameter as will afford an annular space between it and the side walls of said inclosing case, within which annular space are disposed convolutions of steam pipe 23 whose lower end 24 projects outwardly through the lower end of the side wall 10 where it connects with a valve-controlled steam supply pipe 25 while its upper outlet end 26 projects outwardly through the upper portion of the side wall 10 to connect with an escape pipe not shown. Also disposed within said annular space is an upwardly winding trackway made of two bars 27 and 28 of angle iron, each in the form of a helix, the vertical side of each convolution of the bar 28 being secured by angular brackets 29 to the periphery of the drum 22 while the vertical side of each convolution of the bar 27 is secured to upright brackets 30 which are fastened at their upper and lower ends to the inner surfaces of the side wall of said inclosing case.

The convolutions of the bar 27 are disposed in the same inclined plane with corresponding convolutions of the bar 28, and the convolutions of the bar 27 are of such larger diameter than the convolutions of the bar 28 as will afford space for the passage between them of vertical angular bars 31, a plurality of which vertical angular bars 31 have their lower ends secured to an annular plate 32, while their upper ends are secured to the rim 33 of a spoked wheel 34 which is disposed between the top wall of the drum 22 and the top wall 15 of the inclosing case.

The hub of the spoked wheel 34 is keyed to a shaft 35 which is vertically disposed to be rotatable in concentrically disposed bearings 36 and 37 which are secured respectively to the top wall 15 and the bottom wall 16 of the inclosing case thus to extend upwardly from the bearing 37 through the interior of the drum 22 and through a flanged hole 22' in the center of the top wall of said drum 22; and upon the upwardly projecting end portion of said shaft 35 is secured a beveled gearwheel 38 which engages with a beveled gearwheel 39 disposed on the adjacent end of a driving shaft 40 which is adapted to revolve in a bearing 41 secured to the top surface of the wall 15 of the inclosing case as more clearly shown in Fig. 1.

The vertical angular bars 31 are spaced from each other for a sufficient distance to permit the insertion between adjacent ones of them of cans of food products which cans may be successively introduced through the passageway 19, by means hereinafter described, and disposed one after another on the trackway formed by the angular bars 27 and 28, each of which cans will be inserted between different adjacent ones of said vertical angular bars 31 thus to adapt them to be propelled and caused to roll upwardly to the outlet passageway 20 on the winding trackway formed by the bars 27 and 28 in response to a revolution in the proper direction of the wheel 34 due to revolutions of the driving shaft 40.

Figs. 4 and 5 illustrate mechanism adapted to convey successive cans of food products into the inclosing case through the passageway 19 in the lower end portion of the vertical side wall 10 and place such cans one after another between different adjacent ones of the vertical angular bars 31 upon the lower portion of the winding trackway made of the two angular bars 27 and 28 while such vertical angular bars 31 are moving in their circular path between the bars 27 and 28 of said winding trackway.

The passageway 19 is provided with a lateral hood 47 made of sheet iron and of semi-cylindrical form, and a chute 48 that is adapted to permit cans of food products to roll thereon extends through an opening 49 in the wall of the hood 47 to the interior thereof, as more clearly shown in Fig. 5.

Within the passageway 19 is disposed a square plate 42 which is rotatably mounted on a shaft 43, as shown, and to each of the four side edges of said plate 42 is fastened a rectangular frame, as frames 44, from each of which frames 44 is pivotally suspended the upturned end portions of an iron bar 45 which together with its frame 44 serves as a cradle into which a can may fall from the lower end of the chute 48 to be carried by such cradle in a horizontal plane to deposit such can on the winding trackway within the inclosing case in response to the movement of the vertical angular bars 31 due to the rotation of the wheel 34, which bars 31 and frames 44 are so relatively disposed that said bars 31 as they move shall successively engage with and move one of the frames 44 thus to rotate the plate 42 step by step in an obvious manner.

Fixed in the drum 22 is a stud 46 disposed to adapt it to engage with each of the pivotally suspended bars 45 when the frame 44 to which it is attached reaches the proper point over the winding trackway for depositing a can thereon, whereby such bar 45 will be intercepted by said stud 46 thus to swing it sidewise from its can-supporting position as the frame 44 continues its travel thus to let the can drop into its position on the winding trackway between adjacent ones of the vertical angular bars 31, as shown in Fig. 6, to be rolled up said winding trackway by the movement of said bars 31 in an obvious manner.

In order to regulate the passage of successive cans from the chute 48 into the hood 47 and thence into the frames 44 as such frames 44 revolve around the shaft 43, I have provided four spokes 50 fixed on a shaft 51 rotatably mounted in bearings 52, as shown in Fig. 4, to adapt said spokes to project upwardly through slots 53 formed in the bottom wall of the chute 48 thereby to engage with and control the movement of successive cans in their passage from said chute into the hood 47.

Mounted on the shaft 51 is a sprocket wheel 54 upon which is disposed a sprocket chain 55 which extends to and engages with a sprocket wheel 56 which is mounted on a shaft 57 that is disposed to rotate in a sleeve-bearing 58 fixed in the outermost portion of the semi-cylindrical wall of the hood 47 and upon the inner end of the shaft 57 is fixed four spokes 59 which spokes 59, are disposed to adapt them to be engaged by the extended pivots 45' of the pivotally suspended bars 45, whereby, upon each revolution of the frame 44, the sprocket wheel 56 will make one revolution thus to cause the sprocket wheel 54 to make a like revolution and thereby four cans will be admitted into the structure for each revolution of the frames 44.

In order to eject successive cans from the structure through the outlet passageway 20 after they have been rolled up to the upper end of the winding trackway, I have provided mechanism represented by Figs. 7 and 8 wherein 60 is a vertically disposed fixed shaft fastened to the inner side of the side wall 14, and upon said fixed shaft 60 is rotatably mounted a square plate 61 that is provided with frames 62 having pivotally suspended bars 63 to form can carrying cradles, like the cradles in the inlet passageway 19 at the lower end of the side wall 10, said fixed shaft 60 being so disposed that said frames 62 may pass beneath the top ends of the angular bars 27 and 28 of the winding trackway and there be engaged successively by the moving vertical bars 31 to revolve said frames 62 around the shaft 60 as cans successively drop off the end of said winding trackway into successive ones of said frames.

Projecting from the inner side of a hood 64 is a stud 65 disposed to engage successively with the pivotally suspended bars 63 thereby to swing said bars 63 sidewise to permit cans to drop into the upper end of a chute 66 which extends through the wall of the hood 64 which chute 66 is declined to adapt it to let cans roll thereon to a suitable conveyer not shown. Thus in the operation of the structure, when the shaft 40 is rotating, cans of food products may be caused to roll down the chute 48 through the opening 49 into the interior of the hood 47 and there be deposited one after another in the frames 44 which frames 44 will be revolved by the vertical bars 31 successively to carry said cans to a point over the lower end portion of the winding trackway and there dropped on to said trackway each between adjacent ones of said vertical bars 31 to be propelled and rolled upwardly thereon to the top end thereof where said cans may successively drop into the cradles formed by frames 62 and suspended bars 63 which cradles will be actuated to carry said cans through the passageway 20 and deposit them into the chute 66; and while said cans are traveling over said winding trackway they may be subjected to the radiant heat of the convolutions 23 of the steam pipe 24 through which steam may be caused to pass from the valve controlled steam supply pipe 25 to and out of its upper end portion 26 whereby the contents of such cans may be cooked or heated.

The rate at which the vertical bars 31 are moved will determine the length of time during which the cans will be subjected to heat. If, however, it be desired under some conditions, to subject cans of food products to heat for a shorter time, then in such case the ejecting mechanism associated with the passageway 20 may be removed and disposed on a stud 67 in the doorway normally closed by the door 21 and the door 21 may be disposed to close the passageway 20 and the hood 64 may be also moved to cover the passageway within which said door 21 is normally disposed and in such case a portion 68 of the winding trackway, as shown in Fig. 3, opposite the doorway of the door 21, is removed to permit cans to fall therethrough into the ejecting mechanism.

It it be desired live steam for cooking the contents of cans may be admitted into the annular space between the drum 22 and the side walls of the inclosing case by means of a valve-controlled steam supply pipe 69 which is disposed to enter the inclosing case through the bottom end portion of the side wall 14 to extend therefrom in one convolution around the bottom end portion of the drum 22, said pipe 69 being perforated at different points of such convolution to permit steam to escape therefrom into said annular space.

Obviously the winding trackway and its associated mechanism may be modified in its plan of construction to adapt the machine to operate when disposed to rest on its side with the shaft 35 disposed horizontally, and manifestly, changes may be made in the forms, dimensions and arrangement of parts of my invention without departing from the spirit thereof.

What I claim is:

1. In a steam cooker, the combination with an inclosing case having a spiral trackway therein, and means for moving cans over the trackway, of means for feeding and removing cans from the case, said means including rotatably mounted members for holding the cans in suspension, and coöperating means carried by the can supporting means and the case for causing the cans to be dropped on to the trackway and removed therefrom.

2. In a steam cooker, the combination with an inclosing case having a spiral trackway therein, and means for moving cans over said trackway, of means for feeding and removing cans from the case, said means including a rotatably mounted support having radial frames, shiftable means carried by the frames for supporting the cans, and means for operating the shiftable means whereby the cans supported in the frames may be discharged therefrom.

3. In a steam cooker, the combination with an inclosing case having a spiral trackway therein, and means for moving cans over said trackway, of means for feeding and removing cans from the case, said means including radial rectangular frames arranged to be moved into and out of the case, U-shaped hangers carried by the frames for supporting cans, and means for shifting said hangers whereby cans may be removed from the frames.

4. Means for introducing and removing cans from a steam cooker including a rotatably mounted member comprising radial frames, shiftable means carried by the frames for supporting cans, and means for operating the shiftable means whereby cans may be introduced into the cooker and removed therefrom.

5. Means for feeding cans to a steam cooker comprising a rotatably-mounted member having radial frames, swinging can supporting members carried by the frames, and stationary means carried by the cooker adapted to engage the swinging members to cause the cans to be deposited within the cooker.

6. Means for feeding cans to a steam cooker comprising a rotatably-mounted member having radial frames, movable can supporting means carried by the frames, and stationary means carried by the cooker adapted to engage the can supporting means to release the cans from the frames to be deposited in the cooker.

7. Means for feeding cans to a steam cooker comprising a rotatably-mounted member having can supports, and means positioned interiorly of the cooker adapted to engage the can supports whereby the cans may be successively delivered from the supporting means into the cooker.

8. Means for removing cans from a heating chamber comprising a rotatably-mounted member having radial frames, can supporting means carried by the frames, and means positioned exteriorly of the heating chamber adapted to engage the can supporting means to cause the cans to be deposited exteriorly of the chamber.

In witness whereof, I hereunto subscribe my name this 10th day of June, A. D. 1915.

RAYMOND L. EWALD.

Witnesses:
  A. HASKINS,
  GEO. BLAIR.